Nov. 11, 1941.  C. C. WHITTAKER  2,262,413

CURRENT COLLECTOR SYSTEM

Filed Aug. 18, 1939  2 Sheets-Sheet 1

WITNESSES:
C. J. Weller.
G. V. Giolma

INVENTOR
Charles C. Whittaker.
BY
J. M. Crawford
ATTORNEY

Nov. 11, 1941.   C. C. WHITTAKER   2,262,413
CURRENT COLLECTOR SYSTEM
Filed Aug. 18, 1939   2 Sheets-Sheet 2
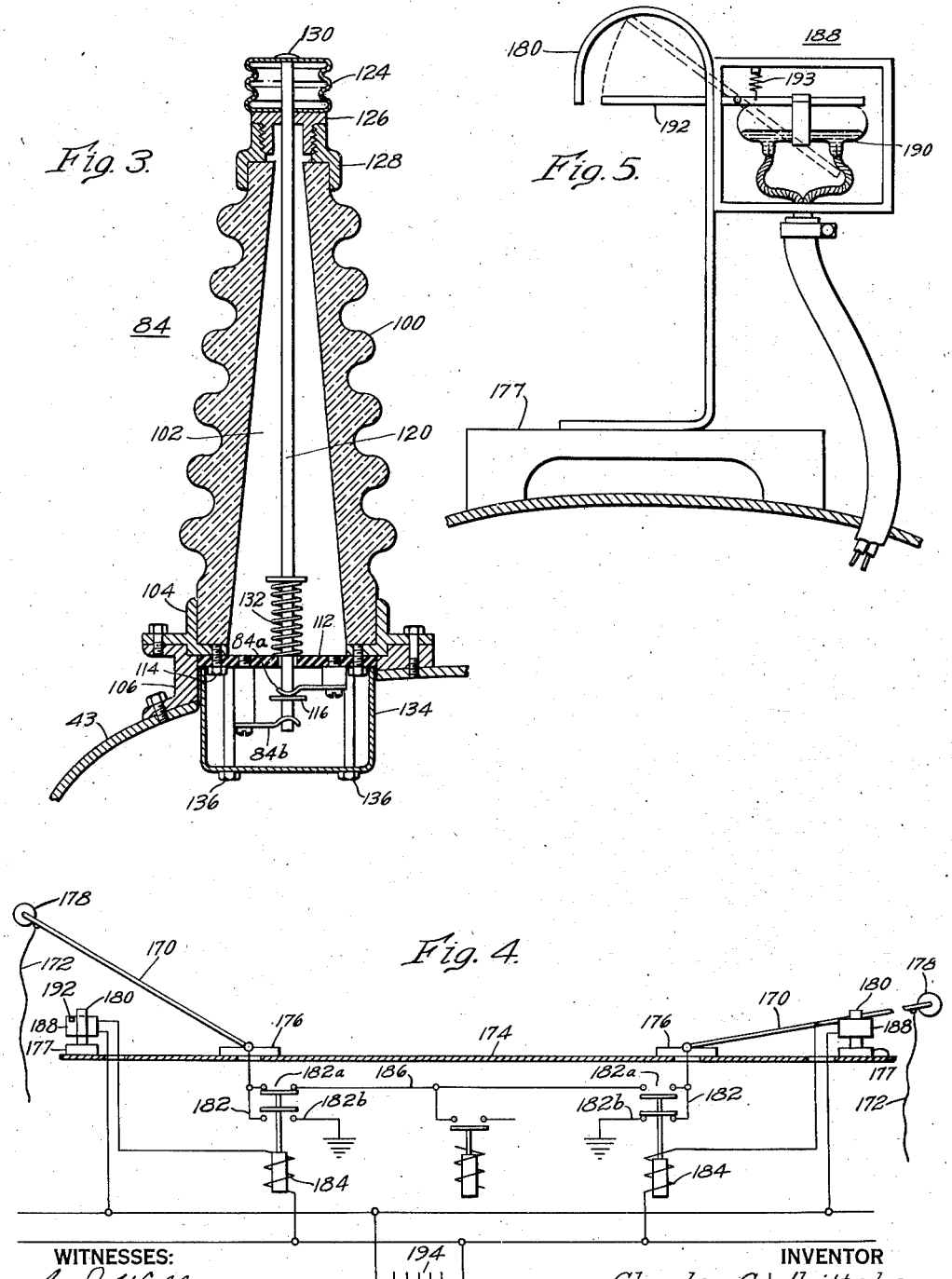
WITNESSES:
C. J. Weller.
F. V. Giolma
INVENTOR
Charles C. Whittaker.
BY
G. M. Crawford
ATTORNEY Patented Nov. 11, 1941

2,262,413

UNITED STATES PATENT OFFICE 2,262,413

CURRENT COLLECTOR SYSTEM

Charles C. Whittaker, Pittsburgh, Pa., assignor to Westinghouse Electric & Manufacturing Company, East Pittsburgh, Pa., a corporation of Pennsylvania Application August 18, 1939, Serial No. 290,775

3 Claims. (Cl. 191—8)

My invention relates generally to current collectors, and it has reference, in particular, to a control system for current collectors.

It is an object of my invention, generally stated, to provide a simple and effective manner for controlling the connections of current collectors on an electrically operated vehicle.

More specifically, it is an object of my invention to provide for connecting a current collector on a vehicle to a power bus when the collector is operated to an energized position, and connecting it to ground when it is operated to a deenergized position.

Another object of my invention is to provide for grounding a current collector on a vehicle when it is in the deenergized position, and disconnecting the current collector from ground upon the operation of the current collector to an energized position, and prevent operation of the current collector to the energized position before it is disconnected from ground.

A further object of my invention is to provide control means responsive to the movement of a current collector on a vehicle to a predetermined position for selectively controlling the connection of the current collector to a power bus.

Yet another object of my invention is to provide in a safe and efficient manner for automatically grounding a current collector on an electrically operated vehicle.

Another important object of my invention is to provide a combined ground and power switch for a current collector on an electrically operated vehicle, for controlling the connection of the current collector in accordance with its position.

Other objects will, in part, be obvious and will, in part, appear hereinafter.

In practicing my invention, suitable switching means may be provided for selectively connecting a current collector on an electrically operated vehicle, either to a power bus for supplying power to the vehicle motors, or to a ground connection so that inspection or repair of the current collector may be made in safety. Since in some instances the difference between the minimum operating height of a current collector and the locked-down or deenergized position is relatively small, I prefer to control the operation of the switching means by a suitable control means, which may be responsive to movement of the current collector as it is operated to the deenergized position. In order to insure that the current collector will be grounded when in the deenergized position, and will not be operated to the energized position while grounded, the switching means may be normally disposed to connect the current collector to ground, and adapted upon energization to connect it to the power bus, so that any failure of the control system will not prevent the grounding of the current collector in the deenergized position; and, in addition, the switching means may be provided with a safety latch device for preventing actuation of the current collector to the energized position until the switching means has been actuated to disconnect the current collector from ground.

For a more complete understanding of the nature and scope of my invention, reference may be had to the following detailed description, taken in connection with the accompanying drawings, in which:

Fig. 3 is an enlarged view, in section, of one form of auxiliary or control switch utilized in the system shown in Fig. 2;

Fig. 4 represents diagrammatically a current collector system employing current collectors of another type, and embodying the invention; and Fig. 5 is an enlarged view of another form of auxiliary or control switch.

Figure 1:
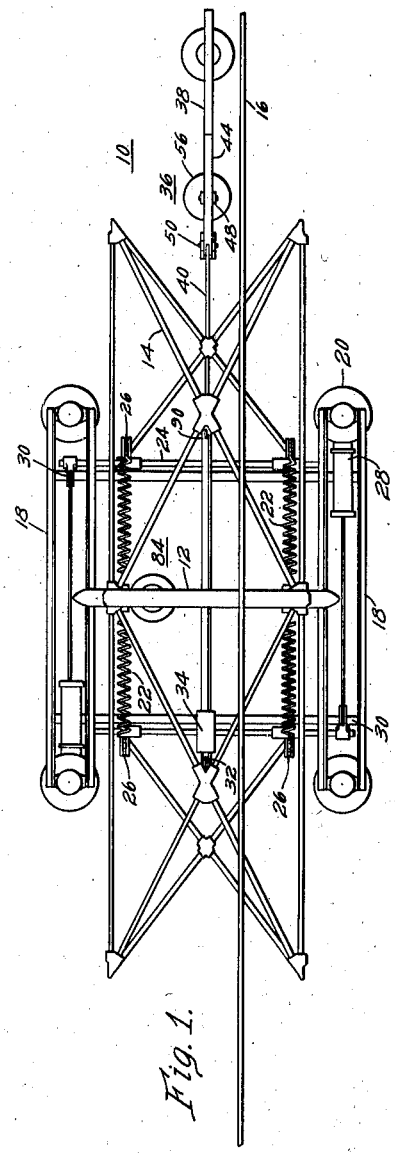
Figure 1 is a plan view of a pantograph type current collector embodying my invention.

Referring particularly to Fig. 1, the reference numeral 10 may denote generally a current collector of any suitable type, comprising, for example, an elongated slider shoe 12 which is mounted on a pantograph supporting structure 14 for engaging an overhead trolley conductor 16. The pantograph structure 14 may be mounted on a suitable frame 18, and supported on the roof of an electrically operated vehicle (not shown) by means of insulators 20.

In order to urge the slider shoe 12 into contact with the trolley conductor 16, suitable means, such as the springs 22, may be provided for effecting rotation of shafts 24 to which the pantograph structure 14 is attached, through the medium of cams 26 which are secured thereto. Actuating means, such as fluid-pressure operated devices 28, may be provided for lowering the pantograph structure 14 to the deenergized position against the force of the springs 22. For example, the fluid pressure devices 28 may be connected to bell crank levers 30 which are attached to the rotatable shafts 24 of the pantograph supporting structure 16, for rotating them against the force applied by the springs 22.

Figure 2:
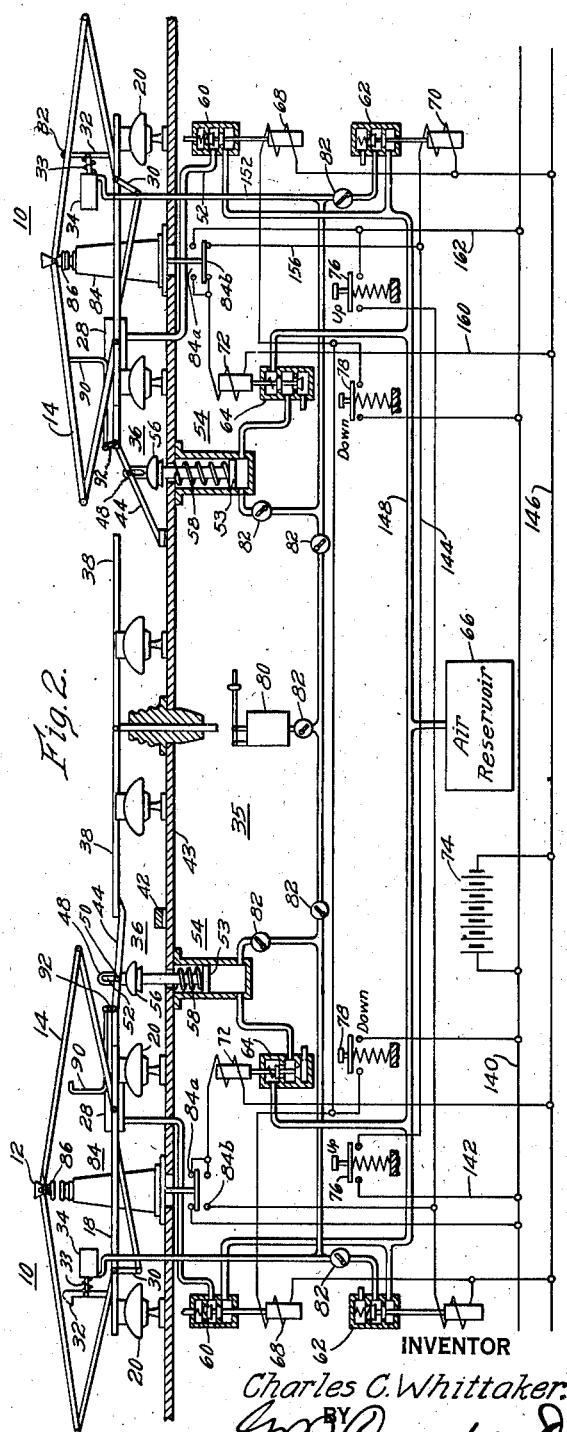
Fig. 2 is a diagrammatic view of a current collector system employing current collectors of the pantograph type and embodying the invention.

Retaining means of any well-known type, such as a pivoted latch member 32, which is best shown in Fig. 2, may be provided, having means, such as a spring 33, for normally retaining the latch in position for engaging the pantograph frame 14, so as to automatically secure the current collector in the deenergized position after it has been lowered by operation of the fluid pressure device 28. Release of the latch member 32 may be effected by means, such as the fluid pressure device 34, which may be operatively connected to the latch member 32 for actuating it to disengage the supporting structure, and release the current collector from the deenergized position.

Referring particularly to Fig. 2, the reference numeral 35 denotes generally a current collector system having a pair of current collectors 10 of the type illustrated in Fig. 1, which may be mounted on the roof of a vehicle. Inasmuch as the circuits, apparatus and structure associated with each of the current collectors are the same, the like elements of each are similarly numbered, so that the description is equally applicable to both.

Accordingly, the reference numeral 36 denotes generally a switch which may be operated to connect the current collector 10 either to a power bus 38 through which power may be supplied to the motors (not shown) of the vehicle, or to a suitable ground connection 42 which may be connected to the metal frame or roof 43 of the vehicle. The switch 36 may be of any suitable type, comprising, for example, a pivoted contact arm 44, which may be operatively connected to an actuating member 48 by means of a pin 50 slidably positioned in a slot 52 therein, so as to provide a certain amount of lost motion between the actuating member 48 and the contact arm 44, in order that the actuating member 48 may deliver a hammer-like blow to the contact arm 44 for operating it, to overcome any tendency of the contact arm to "freeze" to either the power bus 38 or the ground connection 42.

The actuating member 48 may be actuated in any suitable manner, being, for example, operatively connected to the piston 53 of a fluid pressure device 54, and insulated therefrom by means of an insulator 56. Suitable means, such as a spring 58, may be provided for urging the piston 52 downwardly to normally connect the contact arm 44 to the ground connection 42 and ground the current collector 10.

In order to control the operation of the fluid pressure device 28 for lowering the pantograph structure, the fluid pressure device 34 for releasing the latch 32, and the fluid pressure device 54 of the switch 36, suitable control means, such as the electro-pneumatic valves 60, 62 and 64, may be provided for controlling the application of fluid pressure to the fluid pressure devices 28, 34 and 54, respectively, from a suitable source of fluid pressure, such as the reservoir 66, and exhausting the fluid pressure therefrom. The operating windings 68, 70 and 72 of the control valves 60, 62 and 64, respectively, may be energized from a suitable source of control potential, such as a battery 74. For example, "up" pushbuttons 76 may be provided at each end of the vehicle for energizing the operating windings of the control valves 62 and 64 at the opposite end of the vehicle, while "down" pushbuttons 78 may be provided at each end of the vehicle for effecting energization of the operating windings of the control valves 60 at both ends of the vehicle.

In order to provide for operating the fluid pressure devices 34 to release the pantograph structure 14 from the deenergized position when there is no fluid pressure available in the reservoir 66, a hand pump 80 may be connected in the fluid pressure system. Suitable check valves 82 may be provided in the fluid pressure system for permitting the flow of the pressure fluid in one direction only, as desired.

In order to control the operation of the switch 36, in accordance with the movement of the current collector slider shoe 12 to a predetermined position, means, such as the auxiliary or control switch 84, may be provided, which may be actuated in response to the movement of the slider shoe 12 as it approaches the deenergized or locked-down position. For example, a suitable stop member 86 may be provided on support structure 14, or on the underside of the slider shoe 12, to actuate the auxiliary switch 84 as the slider shoe approaches the deenergized or locked-down position. By controlling the energization of the operating windings of the control valves 64 through the contact members of the auxiliary switch 84, the operation of the switch 36 may be so controlled, in accordance with the position of the slider shoe 12, that the slider shoe 12 will be grounded when it is actuated to the deenergized position, and will be disconnected from ground when it is actuated to the energized position.

In order to prevent actuation of the current collector 10 to the energized position before it is disconnected from ground, means may be provided for interlocking the operation of the switch 36 and the pantograph structure 14. For example, a slidable safety latch 90 may be provided, and operatively connected to the contact arm 44 of the ground switch 36, through means, such as the bell crank lever 92, so that when the pantograph structure 14 is lowered and the switch 36 operated to ground the current collector 10, the latch 90 will engage the pantograph structure 14. In this manner, the pantograph structure 14 cannot be raised until the switch 36 has been operated to disconnect the contact arm 44 from the ground connection 42, and thus release the safety latch 90 from engagement with the pantograph support structure 14.

Referring particularly to Fig. 3 of the drawings, the reference numeral 84 denotes generally one form which the auxiliary or control switch for controlling the operation of the switch 36, in accordance with the position of the current collectors, may take. For example, a pillar-type insulator 100 may be provided having a central opening 102 therethrough and a suitable flanged base 104 secured thereto in any desirable manner. An adapter ring 106 may be secured thereto, having the lower surface adapted to fit the contour of the roof 43 of the vehicle on which the switch is to be mounted, and the upper face adapted to fit with the flanged base 104, for facilitating positioning the switch on the roof of the vehicle.

Pairs of stationary contact members 84a and 84b may be positioned within the insulator in any suitable manner, being, for example, mounted on an insulating plate 112 which may be secured to the flanged base 104 of the insulator in any suitable manner, such as by means of bolts 114. A bridging member 116 may be movably positioned for bridging either the stationary contact members 84a or 84b, being, for example, mounted on, and actuated by an axially positioned insulating rod 120, within the insulator, which projects above the top of the insulator for engagement with the stop member 86 of the current collector.

A sealed joint may be provided between the insulating rod 120 and the insulator 100 at the upper end, for permitting actuation of the rod 120 in response to movement of the current collector, relative to the insulator, in any suitable manner, such as, for example, by utilizing a flexible member, such as the metallic bellows member 124. The lower end of the bellows member may be secured to the insulator by means of a nipple 126, which may be threadedly engaged with a flanged end member 128 on the insulator, and the upper end thereof may be attached to the insulator rod 120, by suitable means, such as the screw 130. Biasing means, such as the spring 132 may be provided for urging the insulating rod 120 upwardly so that the bridging member 116 normally engages the stationary contact members 84a to provide a circuit therebetween. A cover member 134 may be provided for enclosing the contact members 84a and 84b, being secured to the switch in any suitable manner, such as by means of the tap bolts 136, so that it may be readily removed for purposes of inspection or repair.

It is usual with a vehicle having current collectors at each end, to use the current collector at the trailing end of the vehicle with the operator positioned at the leading end. In order to release the trailing current collector 10 at the right-hand side of Fig. 2 from the locked-down, or deenergized position, the "up" pushbutton 76, which is positioned toward the left-hand side of the figure, may be closed momentarily for effecting energization of the operating winding of the electro-pneumatic valve 62 which controls the application of fluid pressure to the fluid pressure device 34 of the latch 32. The energizing circuit may be traced from the battery 74 through conductor 140, conductor 142, push-button 76, conductor 144, operating winding 70, and conductor 146 back to the battery 74. Operation of the valve 62 connects the fluid pressure device 34 to the source of fluid pressure 66, through the conduit 148, electro-pneumatic valve 62, check valve 82, and conduit 152. The latch 32 is then actuated to release the pantograph structure 14. Upon the release of the pushbutton 76, the valve 62 returns to the deenergized position, and the fluid pressure device 34 is exhausted so that the spring 33 returns the latch member 32 to the engaging position where it is ready to engage the pantograph structure 14 when it is lowered.

At the same time that the operating winding 70 of the electro-pneumatic valve 62 is energized, the operating winding 72 of the electro-pneumatic valve 64 is also energized. The energizing circuit, therefore, may be traced from the battery 74, through conductor 140, conductor 142, pushbutton 76, conductor 144, conductor 156, contact members 84b, operating winding 72, conductor 160, and conductor 146 back to the battery 74. Fluid pressure is admitted to the device 54 operating the switch 36, so that the contact arm 44 of the switch 36 is disconnected from the ground connection 42 and connected to the power bus 38. Operation of the contact arm 44 actuates the safety latch 90 and releases the pantograph structure 14, which may then be raised to the energized position under the action of the springs 22.

Upon the release of the current collector from the deenergized or locked-down position, the auxiliary switch 84 functions, opening contact members 84b and closing contact members 84a, to complete a shunt holding circuit for the operating winding 72, through conductor 160, winding 72, contact members 84a, and conductor 162 to conductor 146, so that the valve 64 is maintained in the energized position, thus retaining fluid pressure on the fluid pressure device 54, so that the switch 36 is held closed and the current collector is connected to the power bus 38.

In order to lower the current collector 10 from the energized position, the "down" pushbutton 78 may be closed for effecting simultaneous energization of the operating windings 68 of the electro-pneumatic valves 60 from either end of the vehicle, to admit fluid pressure to the fluid pressure devices 28, which are adapted to actuate the pantograph structure 14 to the deenergized or locked-down position.

Upon the lowering of the pantograph structure 14, the auxiliary switch 84 will be actuated by the stop member 86 which engages it. The energizing circuit for the operating winding 72 of the valve 64 is interrupted by the opening of the contact members 84a of the auxiliary switch 84, so that the connection of the fluid pressure device 54 to the source of fluid pressure is terminated and it is exhausted. The spring 58 then actuates the operating member 48, which operates the switch arm 44 to disconnect the current collector 10 from the power bus 38 and ground it through the ground connection 42. When the pantograph structure 14 reaches the deenergized position, the latch 32 then engages the pantograph structure 14 to retain it in this position until the latch is subsequently operated by the application of the fluid pressure to the fluid pressure device 32, as hereinbefore described, to release the pantograph structure.

Referring particularly to Fig. 4, the reference numerals 170 denote current collector supports of the trolley-pole type having ropes 172 attached thereto for raising and lowering them. The trolley poles 170 are adapted to be mounted on the roof 174 of an electrically operated vehicle and insulated therefrom by means of insulation 176, for supporting current collectors 178 of any suitable type. Means, such as the hook devices 180, may be provided for securing the trolley poles in the down or deenergized position. These hook devices may likewise be mounted on the roof 174 of the vehicle, and insulated therefrom by means of suitable insulation 177.

In order to control the electrical connections of the current collectors 178, which are mounted on the trolley poles 170, suitable means, such as the switches 182, may be provided, having operating windings 184, contact members 182a through which the current collectors may be connected to a power bus 186 for supplying power to the motors of the vehicle (not shown), and contact members 182b through which the current collectors 178 may be connected to ground. Auxiliary or control means 188 may be provided in association with the hook members 180 for controlling the energization of the operating windings 184 in accordance with the movement of the current collectors 178 to predetermined positions.

Referring particularly to Fig. 5, it may be seen that the control means 188 may comprise a suitable switch, such as the mercury switch 190, which may be mounted on a pivoted switch arm 192 normally biased to the position in which it is shown by means, such as the spring 193, and which is adapted to be engaged by a trolley pole as it is moved to the deenergized position in the hook member 180. Engagement of the trolley pole with the switch arm 192 actuates the switch arm 192 to the position shown in the dotted outline, so that the mercury switch 190 is tilted, and the connection between the contacts thereof is broken. The operating windings 184 of the switches 182 may be connected in series circuit relation with their respective auxiliary or control switches 188 to a suitable source of power, such as the battery 194. Thus, when the trolley poles are in the deenergized position, the circuits through the auxiliary or control means 188 are broken, and the operating windings of the switches 182 are deenergized, so that the switches 182 are actuated by gravity or other suitable means to close the contact members 182b to connect the current collectors 178 to ground.

Upon the operation of either or both of the current collectors to the energized position, the control circuit through the mercury switch 190 is restored and the energizing circuit for the operating coil of the switch device will be completed, causing operation of a switch device to connect the current collector to the power bus 186.

From the above-detailed description, taken in connection with the accompanying drawings, it will be realized that I have in my invention provided in a simple and effective manner for automatically controlling the connection of a current collector on a vehicle either to ground or to a power bus, in accordance with the operating position of the current collector. By controlling the connection of the current collector in this manner, positive disconnection of the current collector from the power bus and the connection thereof to ground are insured when the current collector is moved to the locked-down or deenergized position, so as to properly protect a workman coming in contact therewith, and disconnection of the current collector from ground and its connection to the power bus are effected as soon as the current collector is released from the deenergized position.

Since certain changes may be made in the above description, and different embodiments of the invention may be made without departing from the spirit thereof, it is intended that all the matter contained in the above description, or shown in the accompanying drawings, shall be considered as illustrative and not in a limiting sense.

I claim as my invention:

1. A current collecting system comprising a pair of current collectors, support means for the current collectors adapted to urge the current collectors into engagement with a conductor, fluid pressure means for actuating the current collectors to the deenergized position, latch means for retaining the current collectors in the deenergized position, a power bus, switch means associated with each current collector for connecting the current collector to ground in the deenergized position, control means for effecting operation of the latch means to release the current collector from the deenergized position, relay means operable upon actuation of the control means to effect operation of the switch means to connect the current collector to the power bus, and control switch means responsive to the release of the current collectors from the deenergized position to provide for maintaining the connection of the switch means to the power bus.

2. A current collecting system comprising, a current collector, a pantograph support structure for urging the current collector against a trolley conductor, fluid pressure means for actuating the pantograph structure to a deenergized position, latch means for engaging the pantograph structure to retain the current collector in the deenergized position actuable by fluid pressure to release the pantograph structure to effect actuation of the current collector to the energized position, a power bus, a ground connection, switch means selectively operable to connect the current collector to the power bus or to the ground connection, an auxiliary switch responsive to operation of the pantograph structure to control the operation of the switch means, and additional latch means adapted to prevent release of the pantograph structure from the deenergized position before operation of the switch means to connect the current collector to the power bus.

3. A current collecting system comprising, a current collector, a supporting structure for urging the current collector against a conductor, fluid pressure means for effecting operation of the supporting structure to actuate the current collector to a deenergized position, latch means to retain the current collector in the deenergized position, a power bus, a ground connection, fluid pressure operated switch means normally connecting the current collector to the ground connection operable to connect the current collector to the power bus, an electro-responsive valve energizable to apply fluid pressure to the switch operating means, means to actuate the current collector to a deenergized position, and an auxiliary switch responsive to actuation of the current collector to the deenergized position to deenergize the electro-responsive valve means to effect operation of the switch means to disconnect the current collector from the power bus and connect it to the ground connection, and set up a control circuit for releasing the latch means.

CHARLES C. WHITTAKER.